US011708083B2

(12) United States Patent
Yamanouchi et al.

(10) Patent No.: US 11,708,083 B2
(45) Date of Patent: Jul. 25, 2023

(54) OPERATION DEVICE FOR AUTONOMOUS VEHICLE

(71) Applicant: Toyota Jidosha Kabushiki Kaisha, Toyota Aichi-ken (JP)

(72) Inventors: Yuchi Yamanouchi, Toyota (JP); Masaharu Kinoshita, Kariya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 16/913,270

(22) Filed: Jun. 26, 2020

(65) Prior Publication Data
US 2020/0406915 A1 Dec. 31, 2020

(30) Foreign Application Priority Data

Jun. 28, 2019 (JP) .................................. 2019-121410

(51) Int. Cl.
*B60W 50/10* (2012.01)
*B60W 60/00* (2020.01)
(Continued)

(52) U.S. Cl.
CPC ............... *B60W 50/10* (2013.01); *B60Q 1/26* (2013.01); *B60W 50/14* (2013.01);
(Continued)

(58) Field of Classification Search
CPC .. B60W 50/10; B60W 50/14; B60W 60/0025; B60W 2050/146;
(Continued)

(56) References Cited

U.S. PATENT DOCUMENTS 9,586,579 B1 * 3/2017 Laskowsky ........... B60W 20/15
9,802,638 B1    10/2017 Stoffel et al.
(Continued)

FOREIGN PATENT DOCUMENTS

JP    S58142726 U    9/1983
JP    2014-069599 A  4/2014
(Continued)

OTHER PUBLICATIONS

Tesla. Tesla Mobile App Walkthrough. YouTube, Mar. 8, 2016, Retrieved from https://www.youtube.com/watch?v=vlVFhT-Djnl (Year: 2016).*

(Continued)

*Primary Examiner* — James J Lee
*Assistant Examiner* — Andrew Sang Kim
(74) *Attorney, Agent, or Firm* — Dinsmore & Shohl LLP

(57) ABSTRACT

An operation device for an autonomous vehicle includes a touch panel configured to display at least one of a start button and a deceleration button, a notification button, and a tab switch on the same screen, the autonomous vehicle being autonomously drivable, the start button being a button for starting driving of the autonomous vehicle in an autonomous drive mode, the deceleration button being a button for decelerating the autonomous vehicle during the autonomous drive mode, the notification button being a button for performing notification to an outside of the autonomous vehicle, and the tab switch being a switch for displaying or enlarging an equipment control button group for controlling equipment mounted on the autonomous vehicle.

6 Claims, 8 Drawing Sheets

(51) Int. Cl.
*B60Q 1/26* (2006.01)
*B60W 50/14* (2020.01)

(52) U.S. Cl.
CPC ... *B60W 60/0025* (2020.02); *B60W 2050/146* (2013.01); *B60W 2540/00* (2013.01)

(58) Field of Classification Search
CPC .......... B60W 2540/00; B60W 60/001; B60W 30/18027; B60W 40/105; B60W 50/082; B60W 2050/0066; B60W 2050/143; B60W 2520/10; B60Q 1/26; B60Q 1/0076; B60K 2370/1438; B60K 2370/1442; B60K 2370/167; B60K 2370/175; B60K 35/00; B60K 37/06; B60K 2370/1434; B60K 2370/152; G06F 3/041; B60R 16/005; B60Y 2300/18025
See application file for complete search history.

(56) References Cited

U.S. PATENT DOCUMENTS

| | | | |
|---|---|---|---|
| 10,742,967 | B2 | 8/2020 | Hoggarth et al. |
| 2009/0198414 | A1 | 8/2009 | Mohning et al. |
| 2015/0073685 | A1 | 3/2015 | Choi et al. |
| 2016/0264021 | A1 | 9/2016 | Gillett |
| 2017/0057519 | A1 | 3/2017 | Ungetheim et al. |
| 2017/0115832 | A1* | 4/2017 | Lucas ................. G06F 3/04847 |
| 2017/0123434 | A1 | 5/2017 | Urano et al. |
| 2017/0151958 | A1 | 6/2017 | Sakuma |
| 2017/0153032 | A1* | 6/2017 | Ashgriz .................. F24F 11/62 |
| 2017/0371334 | A1 | 12/2017 | Nagy et al. |
| 2018/0038139 | A1 | 2/2018 | Zindler |
| 2018/0041753 | A1 | 2/2018 | Hoggarth et al. |
| 2018/0095608 | A1 | 4/2018 | Jablonski |
| 2018/0173237 | A1 | 6/2018 | Reiley et al. |
| 2018/0194280 | A1 | 7/2018 | Shibata et al. |
| 2018/0206391 | A1 | 7/2018 | Shinkai et al. |
| 2018/0208211 | A1 | 7/2018 | Chiba |
| 2018/0292829 | A1* | 10/2018 | Li ........................ B60W 10/18 |
| 2018/0356818 | A1 | 12/2018 | Arai et al. |
| 2018/0373343 | A1 | 12/2018 | Hashimoto et al. |
| 2018/0374002 | A1 | 12/2018 | Li |
| 2020/0393826 | A1 | 12/2020 | Golgiri et al. |
| 2020/0406922 | A1 | 12/2020 | Yamanouchi et al. |

FOREIGN PATENT DOCUMENTS

| | | | |
|---|---|---|---|
| JP | 2015-232740 | A | 12/2015 |
| JP | 2016-030457 | A | 3/2016 |
| JP | 2017-024521 | A | 2/2017 |
| JP | 2017-119508 | A | 7/2017 |
| JP | 2018-000156 | A | 1/2018 |
| JP | 2018-108764 | A | 7/2018 |
| JP | 2019-006277 | A | 1/2019 |
| JP | 2019-103422 | A | 6/2019 |
| KR | 10-2007-0098440 | A | 10/2007 |
| KR | 10-2015-0019353 | A | 2/2015 |
| KR | 10-2015-0029056 | A | 3/2015 |
| RU | 2669910 | C2 | 10/2018 |

OTHER PUBLICATIONS

Samsung Global Newsroom, Get Things Done Faster with the Newly Enhanced Edge Screen, Feb. 15, 2016, Samsung Newsroom, Retrieved from https://news.samsung.com/global/get-things-done-faster-with-the-newly-enhanced-edge-screen (Year: 2016).*
Mark Guim, Oh snap! 3 other ways to arrange multiple windows in Windows 10, Aug. 21, 2015, Windows Central, Retrieved from https://www.windowscentral.com/4-ways-arrange-multiple-windows (Year: 2015).*
Burkhalter, Ken. "Customizing the Menu Bar." IPhoneLife.com, IPhone Life, Apr. 4, 2016, https://web.archive.org/web/20161201002433/ https://www.iphonelife.com/blog/2440/customizing-menu-bar. (Year: 2016).*
Walker, James. "How to Change the Taskbar Position in Windows 10." OnMSFT.com, Jul. 27, 2017, https://www.onmsft.com/how-to/how-to-change-taskbar-position-windows-10. (Year: 2017).*
MacPherson, Erin. "How to Customize Your Iphone Dock in IOS 15." Www.iphonelife.com, Apr. 18, 2022, https://www.iphonelife.com/blog/2440/customizing-menu-bar#:~:text=The%20iPhone%20Dock%20is%20located,to%20navigate%20between%20Home%20screens. (Year: 2022).*
U.S. Appl. No. 16/887,661, filed May 29, 2020.
U.S. Office Action dated Nov. 24, 2021 to U.S. Appl. No. 16/887,661.
Tesla. Tesla Mobile App Walkthrough. YouTube, Mar. 8, 2016, https://www.youtube.com/watch?v=vlVFhT-Djnl. (Year: 2016).
Office Action dated Apr. 8, 2022 in U.S. Appl. No. 16/887,661.
Burt, Ashley, "Volvo trucks and cars can now alert each other to potential hazards", My Little Salesman, May 29, 2018, URL: https://www.mylittlesalesman.com/news/volvo-trucks-and-cars-can-now-alert-each-other-to-potential-hazards.
Notice Of Allowance dated Sep. 27, 2022 to U.S. Appl. No. 16/887,661, filed May 29, 2020.
Notice Of Allowance dated Mar. 20, 2023, issued To U.S. Appl. No. 16/887,661, filed May 29, 2020.
Notice Of Allowance dated Apr. 4, 2023, Issued To U.S. Appl. No. 17/874,665, filed Jul. 27, 2022.
Corrected Notice Of Allowability Issued To U.S. Appl. No. 16/887,661 dated Oct. 31, 2022.
Non-Final Office Action Issued To U.S. Appl. No. 17/874,665 dated Dec. 14, 2022.

* cited by examiner

OPERATION DEVICE FOR AUTONOMOUS VEHICLE

CROSS-REFERENCE TO RELATED APPLICATIONS

This application claims priority to Japanese Patent Application No. 2019-121410 filed on Jun. 28, 2019, which is incorporated herein by reference in its entirety including the specification, drawings and abstract.

BACKGROUND

1. Technical Field

This specification relates to an operation device for an autonomous vehicle.

2. Description of Related Art

Autonomous vehicles capable of driving autonomously are known in the art. Autonomous driving means that a computer performs drive control including acceleration and deceleration control, brake control, and steering control without operation by an operator.

The autonomous vehicles are equipped with an operation device for the operator to input various commands. For example, Japanese Unexamined Patent Application Publication No. 2019-6277 (JP 2019-6277 A) discloses an autonomous vehicle provided with mechanical switches and an autonomous driving on and off switch. The mechanical switches are switches for operating equipment (an air conditioning system etc.) mounted on the autonomous vehicle and are provided near a dashboard. The autonomous driving on and off switch is a switch for turning on and off an autonomous drive mode and is provided on the side of the driver's seat. Japanese Unexamined Patent Application Publication No. 2017-24521 (JP 2017-24521 A) discloses an autonomous vehicle with a touch panel. In this autonomous vehicle, the drive mode is changed using the touch panel.

SUMMARY

It is possible to perform operations for controlling equipment mounted on an autonomous vehicles using a touch panel. In this case, equipment control buttons for controlling the equipment are displayed on the touch panel, and an operator operates these buttons to control the equipment.

In the case where a plurality of buttons are required to control a single piece of equipment mounted on the autonomous vehicle or in the case where the autonomous vehicle has a plurality of pieces of equipment, the number of equipment control buttons to be displayed on the touch panel is increased. In the case where a large number of equipment control buttons are displayed on the touch panel, the screen of the touch panel becomes complicated and it takes time for the operator to find the button to operate. The touch panel therefore may have reduced operability.

Especially in the case where a vehicle speed control button for performing vehicle speed control of the autonomous vehicle including start control, stop control, and acceleration and deceleration control or a notification button for performing notification to the outside of the vehicle such as an operation of blinkers, hazard lights, or a horn is displayed on the touch panel in addition to the equipment control buttons, the vehicle speed control button and the notification button are both considered to be operated frequently, or the operator may sometimes need to operate the vehicle speed control button or the notification button quickly. It is therefore particularly not desirable for the touch panel displaying the vehicle speed control button and the notification button to have reduced operability due to the plurality of equipment control buttons displayed thereon.

An operation device for an autonomous vehicle disclosed in the specification restrains reduction in operability of a touch panel for performing vehicle speed control of the autonomous vehicle, performing notification to the outside of the vehicle, and controlling equipment mounted on the autonomous vehicle.

One aspect of the disclosure provides an operation device for an autonomous vehicle. The operation device for the autonomous vehicle according to this aspect includes a touch panel configured to display at least one of a start button and a deceleration button, a notification button, and a tab switch on the same screen, the autonomous vehicle being autonomously drivable, the start button being a button for starting driving of the autonomous vehicle in an autonomous drive mode, the deceleration button being a button for decelerating the autonomous vehicle during the autonomous drive mode, the notification button being a button for performing notification to an outside of the autonomous vehicle, and the tab switch being a switch for displaying or enlarging an equipment control button group for controlling equipment mounted on the autonomous vehicle.

With the above configuration, the equipment control button group is not displayed on the touch panel or is displayed in a reduced size on the touch panel before the tab switch is operated. This makes the screen including a vehicle speed control button (at least one of the start button and the deceleration button) and the notification button simpler. In addition to vehicle control of the autonomous vehicle and notification to the outside of the vehicle, control of the equipment mounted on the autonomous vehicle can also be performed using the touch panel, and at the same time, reduction in operability of the touch panel is restrained. Since the vehicle speed control button, the notification button, and the tab switch are displayed on the same screen, the operator operating the vehicle speed control button and the notification button can immediately operate the tab switch to cause the equipment control button group to be displayed on the screen.

In the above aspect, the tab switch may correspond to the equipment mounted on the autonomous vehicle, and when the tab switch is operated, the equipment control button group for controlling the equipment corresponding to the tab switch may be displayed or enlarged.

In the above aspect, the tab switch may be displayed at any of upper, lower, right, and left ends of a screen, and the equipment control button group may be displayed or enlarged when an operator slides the tab switch toward a middle of the screen.

In the above aspect, a state of the autonomous vehicle may further be displayed on the same screen of the touch panel.

In the above aspect, at least a part of the equipment control button group may be displayed or enlarged so as to be superimposed on at least a part of a state indicator indicating the state of the autonomous vehicle.

In the above aspect, at least one of the start button and the deceleration button or the notification button may be operable with the equipment control button group being displayed or enlarged.

In the above aspect, a plurality of tab switches including the tab switch may be provided, and a plurality of equipment control button groups corresponding to the plurality of tab switches may be displayable or enlargeable simultaneously.

In the above touch panel, a permanent equipment control button for controlling permanent equipment mounted on the autonomous vehicle that is different from the equipment corresponding to the tab switch may further be displayed on the same screen of the touch panel.

The operation device for the autonomous vehicle disclosed in the specification restrains reduction in operability of the touch panel for performing vehicle speed control of the autonomous vehicle, performing notification to the outside of the vehicle, and controlling equipment mounted on the autonomous vehicle.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
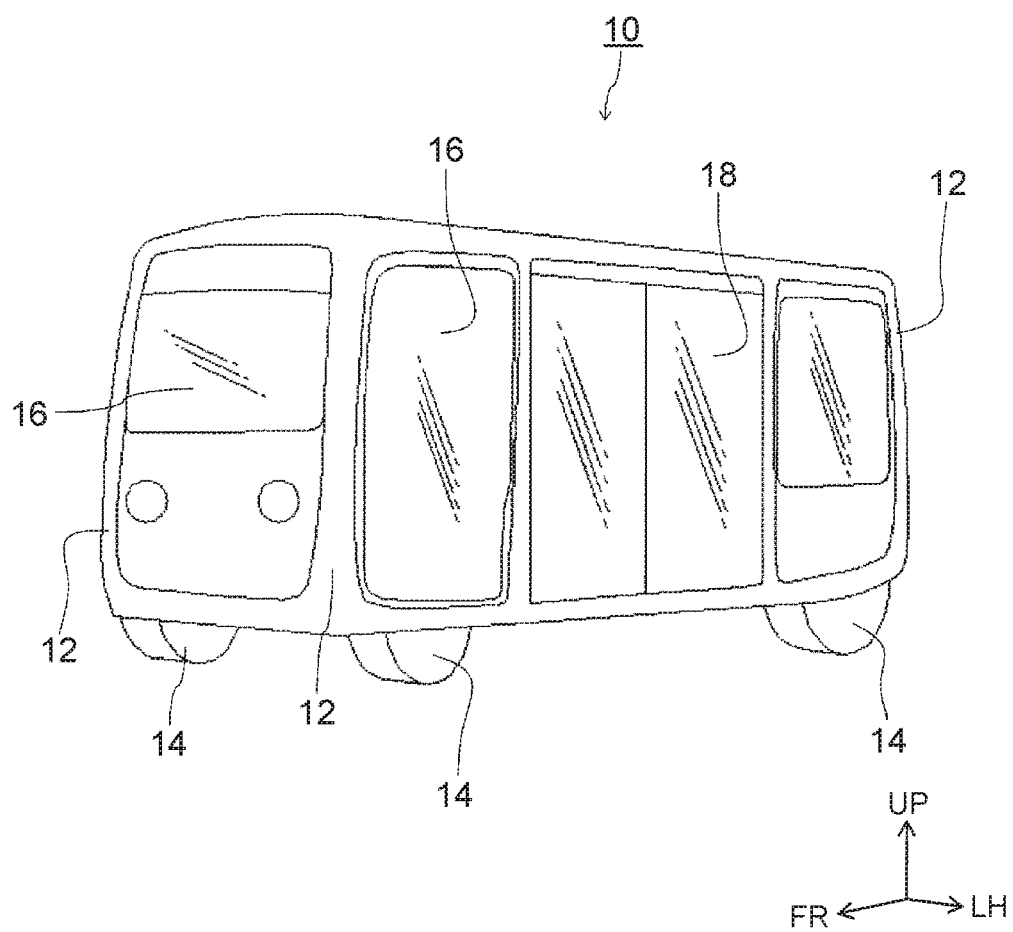
FIG. 1 is an external view of an autonomous vehicle according to an embodiment.

FIG. 1 is an external view of an autonomous vehicle 10 according to an embodiment. In the drawings of the specification, front (FR) and rear mean front and rear in the longitudinal direction of the vehicle, right and left (LH) mean right and left when facing forward, and upper (UP) and lower mean upper and lower in the vertical direction of the vehicle.

The autonomous vehicle 10 is generally in the shape of a rectangular parallelepiped. The autonomous vehicle 10 has a longitudinally symmetrical shape. The external design of the autonomous vehicle 10 is also longitudinally symmetrical. The autonomous vehicle 10 has vertical pillars 12 at its four corners as viewed in plan and has wheels 14 below the pillars 12. Large parts of front, rear, right, and left side walls of the autonomous vehicle 10 are translucent panels 16. The panels 16 may be display panels, and characters etc. may be displayed on the panels 16.

A part of the panel 16 on the left side of the autonomous vehicle 10 is a slidable door 18, and an occupant can get in and out of the autonomous vehicle 10 as the door 18 slides open. Although not shown in FIG. 1, a retractable ramp is accommodated below the door 18. The ramp is used for an occupant on a wheelchair to get in and out of the autonomous vehicle 10 etc.

The autonomous vehicle 10 is a vehicle capable of driving autonomously. Specifically, the autonomous vehicle 10 can drive in a plurality of drive modes including an autonomous drive mode, a semi-autonomous drive mode, and a manual drive mode.

The autonomous drive mode is a drive mode in which a computer (drive control unit (described later)) mounted on the autonomous vehicle 10 performs most of drive control. As used herein, the drive control is a concept including gear shift control, vehicle speed control, steering control, and notification to the outside of the autonomous vehicle 10 (the outside of the vehicle). The vehicle speed control is a concept including start control, stop control, and acceleration/deceleration control of the autonomous vehicle 10. The notification to the outside of the vehicle includes, for example, a blinker operation, a hazard light operation, and a horn sound.

The autonomous vehicle 10 can communicate with a management center that manages and controls a plurality of autonomous vehicles 10. In the autonomous drive mode, the autonomous vehicle 10 is controlled by the management center to travel along a predetermined route. In the autonomous drive mode, the computer performs the drive control according to drive commands received from the management center. However, only the start control from the stopped state is performed by operation by an operator riding in the autonomous vehicle 10.

In the autonomous drive mode, the vehicle speed control and the notification to the outside of the vehicle can be performed not only by control from the management center but also by operation by the operator. In the present embodiment, the deceleration control of the vehicle speed control can be performed by operation by the operator during autonomous driving. The vehicle speed control other than the deceleration control may be able to be performed by operation by the operator during autonomous driving. Among the notifications to the outside of the vehicle, the blinkers and the hazard lights can be turned on and off and the horn can be honked by operation by the operator.

The semi-autonomous drive mode is a drive mode in which the computer mounted on the autonomous vehicle 10 performs most of the drive control of the autonomous vehicle 10 as in the autonomous drive mode. In the semi-autonomous drive mode, the computer performs the drive control based on detection results from various sensors (e.g., a camera and a LIDAR) mounted on the autonomous vehicle 10 rather than according to commands from the management center such that the autonomous vehicle 10 travels along a predetermined route. In the semi-autonomous drive mode as well, only the start control from the stopped state is performed by operation by the operator riding in the autonomous vehicle 10, and the vehicle speed control and the notification to the outside of the vehicle can also be performed by operation by the operator.

The manual drive mode is a mode in which the autonomous vehicle 10 does not drive autonomously but the operator riding in the autonomous vehicle 10 performs the drive control of the autonomous vehicle 10.

The autonomous vehicle 10 is a shared-ride vehicle in which a large unspecified number of occupants share the ride. In the present embodiment, the autonomous vehicle 10 is used as a bus that transports passengers while traveling along a prescribed route within a specific site. It is therefore assumed that autonomous vehicle 10 repeatedly stops and starts relatively frequently. It is also assumed that the autonomous vehicle 10 travels at relatively low speeds (e.g., 30 km/h or less).

However, the form in which the autonomous vehicle 10 disclosed in the specification is used can be changed as appropriate. For example, the autonomous vehicle 10 may be used as a mobile business space or may be used as a retail store that displays and sells various products or a store such as a restaurant that prepares and serves food and drinks. Alternatively, the autonomous vehicle 10 may be used as an office for office work, meetings with customers, etc. The autonomous vehicle 10 is not only used for businesses, but may be used as, e.g., personal transportation. The traveling pattern and the traveling speed of the autonomous vehicle 10 may also be changed as appropriate.

The autonomous vehicle 10 is an electric vehicle having as a prime mover a drive motor that receives power supply from a battery. The battery is a rechargeable secondary battery and is periodically charged with external power. The autonomous vehicle 10 is not limited to the electric vehicle but may be other types of vehicles. For example, the autonomous vehicle 10 may be an engine vehicle equipped with an engine as a prime mover, or a hybrid vehicle equipped with an engine and a drive motor as prime movers. The autonomous vehicle 10 may be a hydrogen vehicle that drives a drive motor with electric power generated by a fuel cell.

Figure 2:
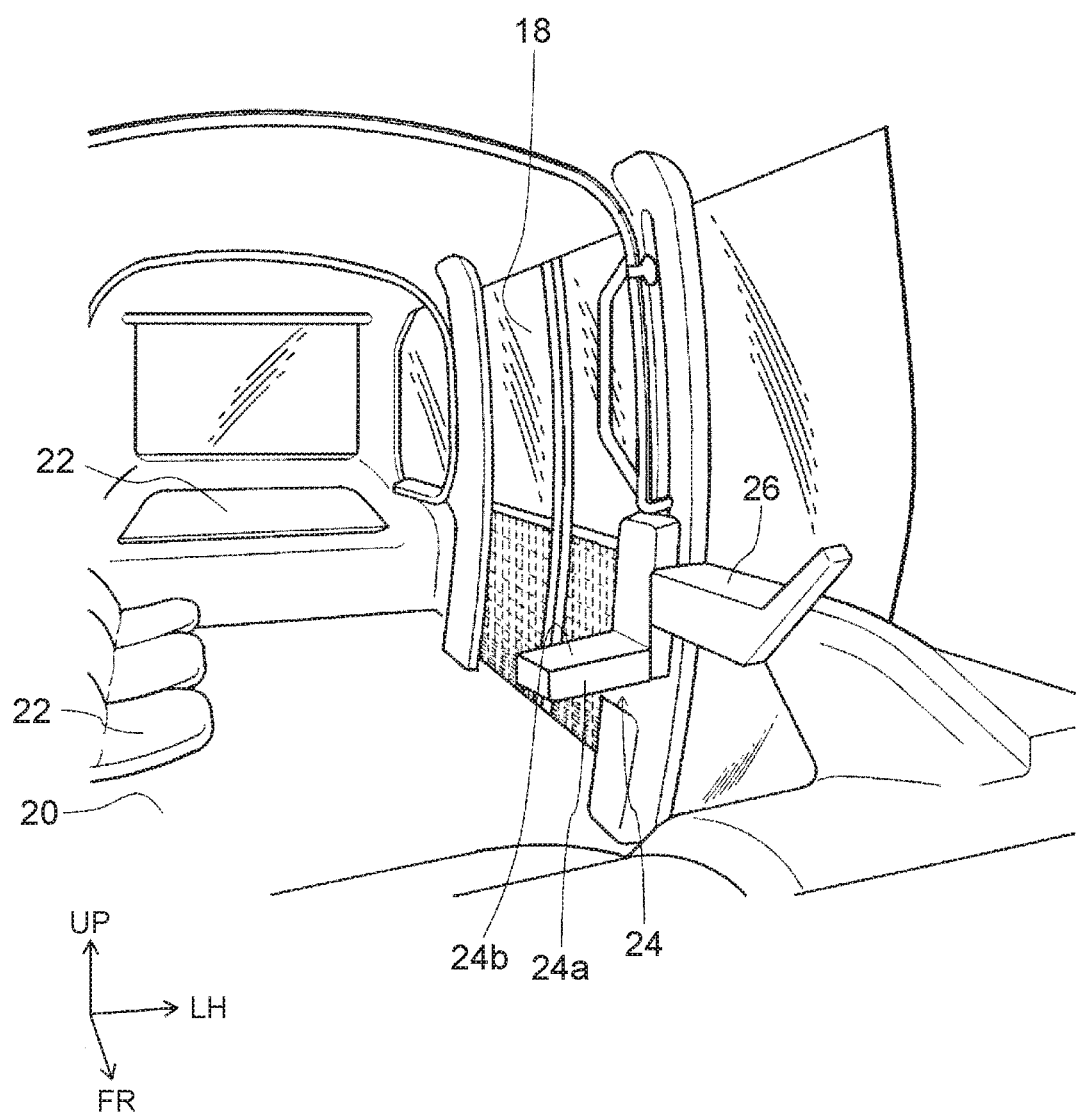
FIG. 2 is a first perspective view showing the inside of a passenger compartment of the autonomous vehicle according to the embodiment.
Figure 3:
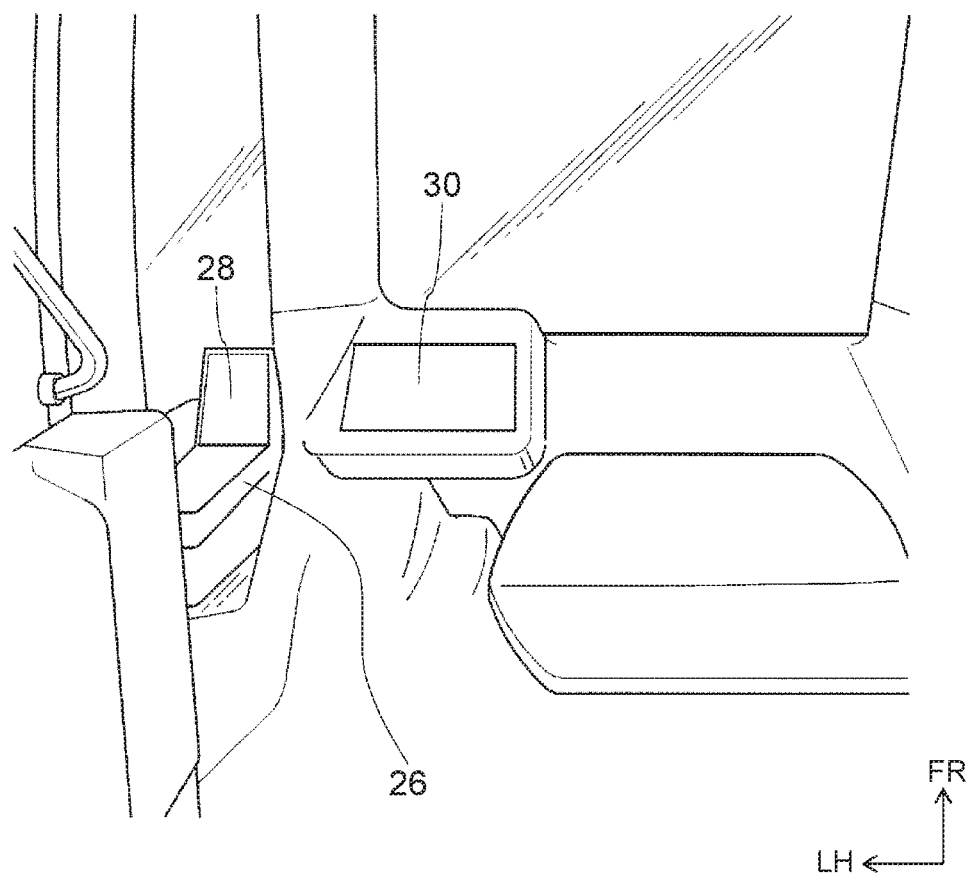
FIG. 3 is a second perspective view showing the inside of the passenger compartment of the autonomous vehicle according to the embodiment.

FIGS. 2 and 3 are perspective views showing the inside of a passenger compartment of the autonomous vehicle 10. As described above, the autonomous vehicle 10 is used as a bus. The central portion of the passenger compartment is therefore a floor 20 for standing occupants or occupants on wheelchairs. The autonomous vehicle 10 has seats 22 for occupants along the inner side wall of the passenger compartment.

The autonomous vehicle 10 has an operator seat 24 for an operator who performs the drive control of the autonomous vehicle 10, performs the notification to the outside of the vehicle (operates the blinkers, the hazard lights, the horn, etc.), and controls equipment (an air conditioning system, wipers, headlamps, taillamps, etc.) mounted on the autonomous vehicle 10. FIG. 2 shows a seating portion 24a of the operator seat 24 being lowered and a seat surface 24b faces upward. However, the seating portion 24a can be flipped up. In the present embodiment, the operator seat 24 is provided on the left inner side surface of the passenger compartment near the front side of the door 18. However, the operator seat 24 may be provided on the right inner side surface of the passenger compartment.

An armrest 26 for the operator sitting on the operator seat 24 to place his or her arm is provided on the front side of the operator seat 24. The armrest 26 extends in the longitudinal direction of the vehicle. As described above, in the present embodiment, the operator seat 24 is provided on the left inner side surface of the passenger compartment.

The armrest 26 is therefore disposed on the left inner end of the passenger compartment. In the case where the operator seat 24 is provided on the right inner side surface of the passenger compartment, the armrest 26 is disposed on the right inner end of the passenger compartment. The armrest 26 is located above the seat surface 24b of the operator seat 24 lowered to a sittable position.

A touch panel 28 is mounted on the front end of the armrest 26 so as to stand upward from the upper surface of the armrest 26 (see FIG. 3). The touch panel 28 has a display surface (operation surface) facing rearward (that is, facing toward the operator seat 24). This allows the operator sitting on the operator seat 24 to place his or her arm on the armrest 26 and operate the touch panel 28 with his or her hand. The touch panel 28 allows the operator to input a vehicle speed control command, a command to notify the outside of the vehicle, an equipment control command for the equipment mounted on the autonomous vehicle 10, a command to change the drive mode, etc. The display screen of the touch panel 28 will be described in detail later.

The armrest 26 may be provided with a mechanical operation unit (not shown) for inputting a drive control command to the autonomous vehicle 10. For example, the mechanical operation unit may be in the form of a stick that can be tilted to the front and rear and to the right and left. The mechanical operation unit may be operable in any drive mode of the autonomous vehicle 10 but is mainly used in the manual drive mode.

A display 30 that displays information on the autonomous vehicle 10 is provided in the front left corner of the passenger compartment (see FIG. 3). The display 30 displays, for example, information such as the vehicle speed of the autonomous vehicle 10, the outside air temperature, and the next bus stop.

In the present embodiment, the operation device for the autonomous vehicle 10 includes the touch panel 28 and the mechanical operation unit. The autonomous vehicle 10 is not provided with a foot-operated foot pedal for inputting a vehicle speed control command, such as an accelerator pedal or a brake pedal, which is provided in conventional automobiles etc.

Figure 4:
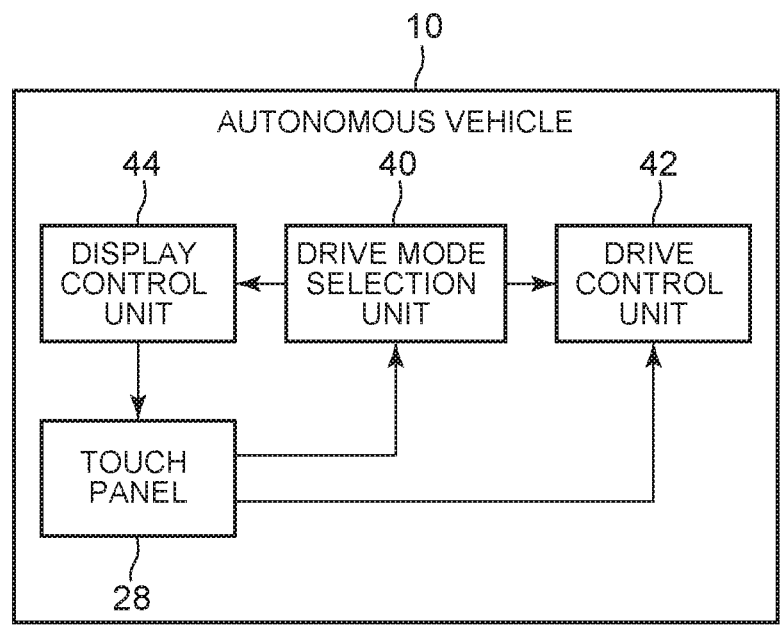
FIG. 4 is a functional block diagram of the autonomous vehicle according to the embodiment.

FIG. 4 is a functional block diagram of the autonomous vehicle 10. The autonomous vehicle 10 includes a drive mode selection unit 40, a drive control unit 42, and a display control unit 44 in addition to the touch panel 28. The drive mode selection unit 40, the drive control unit 42, and the display control unit 44 are implemented by cooperation of hardware such as a processor and software for operating the hardware.

The drive mode selection unit 40 selects one of the autonomous drive mode, the semi-autonomous drive mode, and the manual drive mode of the autonomous vehicle 10 based on a drive mode change command input by the operator via the touch panel 28.

According to the drive mode selected by the drive mode selection unit 40, the drive control unit 42 performs the drive control of the autonomous vehicle 10 based on a drive control command received from the touch panel 28 or the mechanical operation unit, a drive control command received from the management center, and detection results received from the various sensors mounted on the autonomous vehicle 10.

The display control unit 44 controls the touch panel 28 to display various screens. The various screens of the touch panel 28 will be described below. These screens are all displayed under the control of the display control unit 44.

The display screens of the touch panel 28 will be described with reference to FIGS. 5 to 9.

Figure 5:
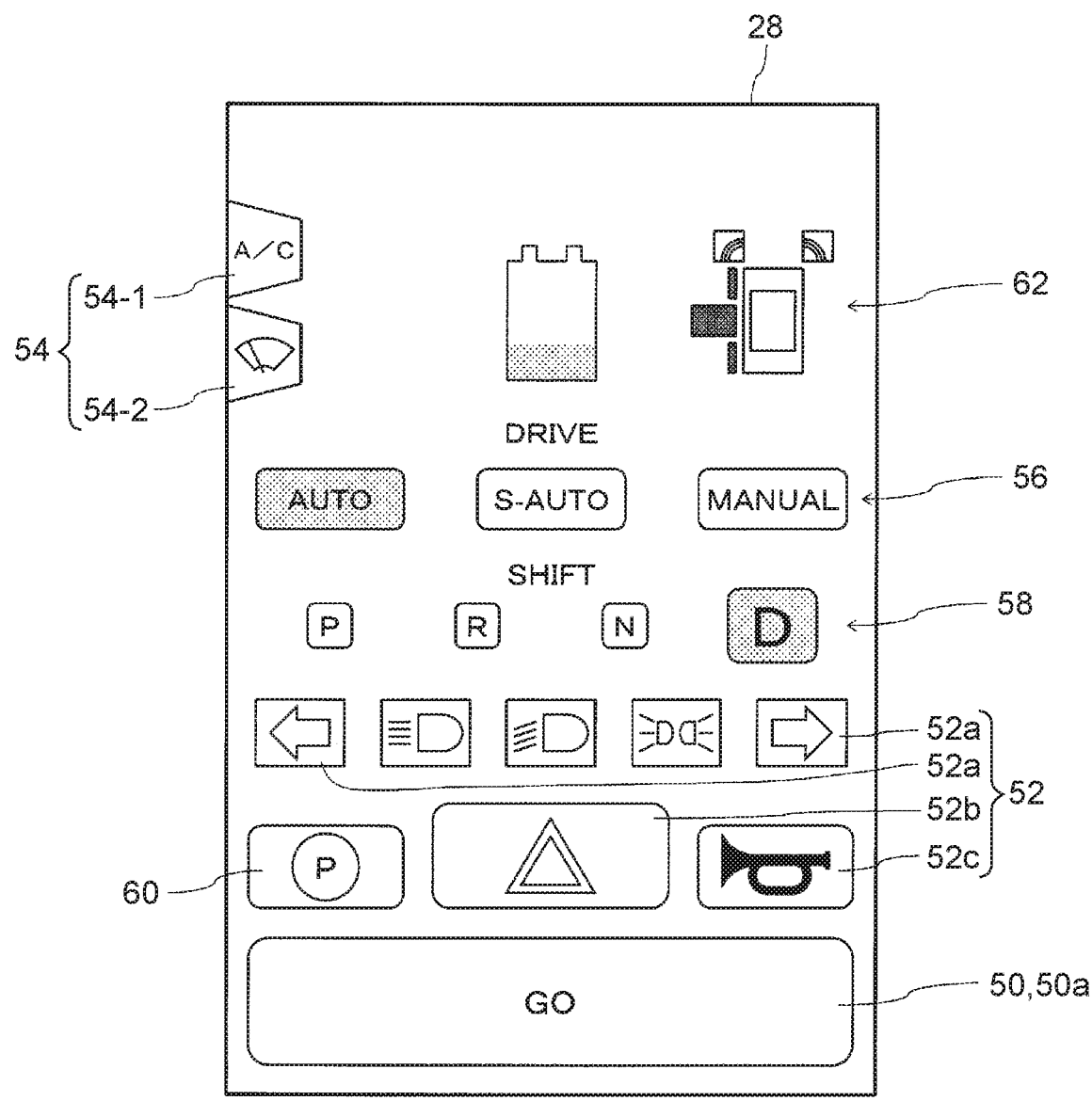
FIG. 5 illustrates a screen that is displayed on a touch panel when the autonomous vehicle in an autonomous drive mode is stopped.

FIG. 5 illustrates a display screen that is displayed on the touch panel 28 when the autonomous vehicle 10 in the autonomous drive mode is stopped. The display screen of the touch panel 28 in the autonomous drive mode will be described below. However, the display screen of the touch panel 28 is mostly the same in every drive mode.

Figure 6:
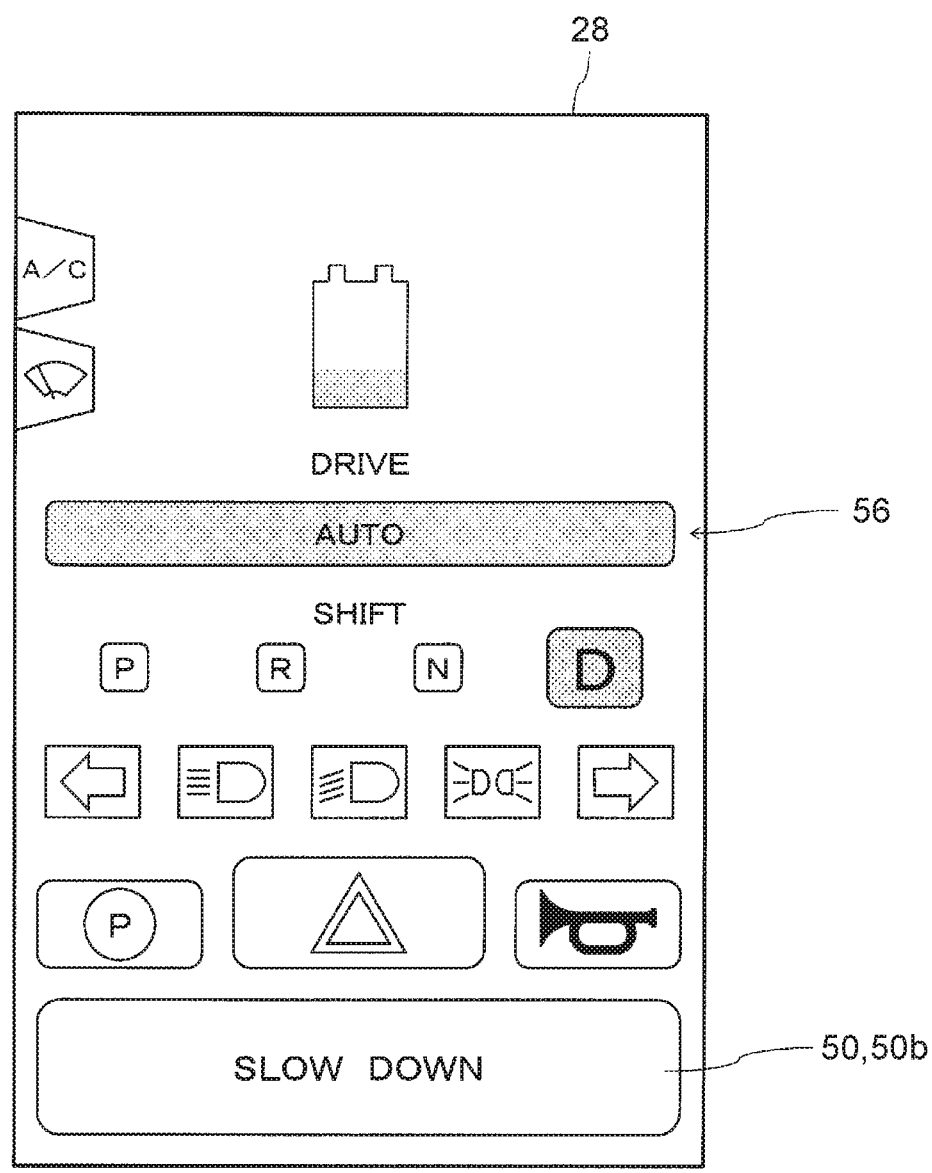
FIG. 6 illustrates a screen of the touch panel during autonomous driving.

The touch panel 28 displays a vehicle speed control button 50 for inputting a vehicle speed control command to the autonomous vehicle 10 and notification buttons 52 for inputting a command to notify the outside of the vehicle. In the present embodiment, when the autonomous vehicle 10 is stopped, the touch panel 28 displays a GO button 50a as the vehicle speed control button 50. The GO button 50a is a start button for inputting a start command to the autonomous vehicle 10. As shown in FIG. 6, when the autonomous vehicle 10 starts autonomous driving, the touch panel 28 displays a SLOW DOWN button 50b instead of the GO button 50a as the vehicle speed control button 50. The SLOW DOWN button 50b is a deceleration button for inputting a deceleration command. The autonomous vehicle 10 can be stopped by keep operating the SLOW DOWN button 50b. Accordingly, it can be said that the SLOW DOWN button 50b is a button for inputting a stop command to stop the autonomous vehicle 10. In the present embodiment, the touch panel 28 displays, as the notification buttons 52, blinker buttons 52a for inputting a command to turn on and off the blinkers, a hazard button 52b for inputting a command to turn on and off the hazard lights, and a horn button 52c for inputting a command to honk the horn. In the present embodiment, the touch panel 28 displays the plurality of notification buttons 52. However, the touch panel 28 may display a single notification button 52. Alternatively, the touch panel 28 may display other types of the notification button 52 other than the above notification buttons 52.

The touch panel 28 further displays tab switches 54. As shown in FIG. 5, in the present embodiment, the touch panel 28 displays two tab switches 54-1, 54-2. The touch panel 28 may display only one tab switch 54 or three or more tab switches 54. When any of the tab switches 54 is operated by the operator, the touch panel 28 displays a group of equipment operation buttons for operating the equipment mounted on the autonomous vehicle 10.

The tab switches 54 are displayed on the same screen as the vehicle speed control button 50 and the notification buttons 52. The expression "displayed on the same screen" herein means that the vehicle speed control button 50, the notification buttons 52, and the tab switches 54 are displayed on the touch panel 28 so as to be operable without the need for the operator to perform a separate operation (e.g., an operation to switch the screen). For example, the expression "displayed on the same screen" refers to the vehicle speed control button 50, the notification buttons 52, and the tab switches 54 being displayed simultaneously. Accordingly, for example, in the case where the touch panel 28 can display a plurality of split screens on one screen, it can be said that the vehicle speed control button 50, the notification buttons 52, and the tab switches 54 are displayed on the same screen even when the vehicle speed control button 50, the notification buttons 52, and the tab switches 54 are displayed on the separate screens, as long as the vehicle speed control button 50, the notification buttons 52, and the tab switches 54 are displayed so as to be operable without the need for the operator to perform a separate operation.

Figure 7:
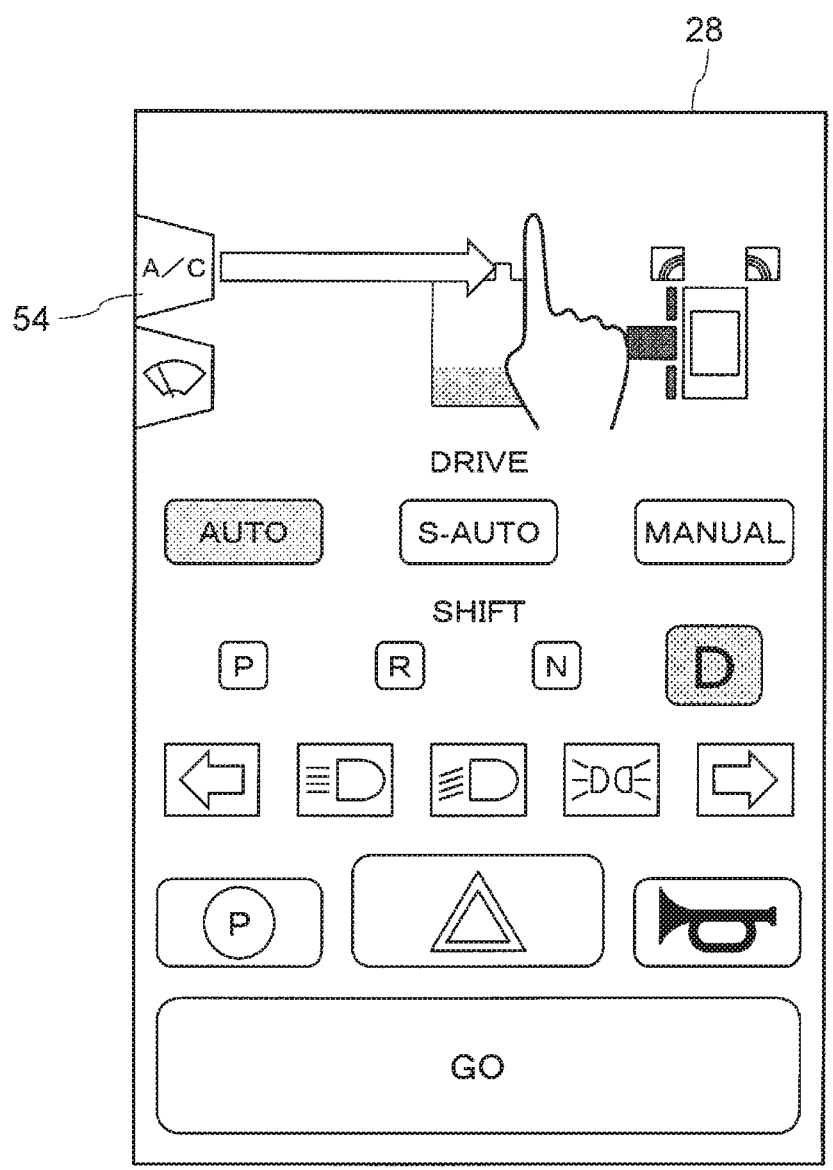
FIG. 7 illustrates how an operator slides a tab switch.

In the present embodiment, the tab switches 54 correspond to the equipment mounted on the autonomous vehicle 10. For example, one tab switch 54 corresponds to a single piece of equipment. In the example of FIG. 5, the tab switch 54-1 corresponds to the air conditioning system, and the tab switch 54-2 corresponds to the wipers. It is desirable that each tab switch 54 be clearly labeled with its corresponding equipment. In the example of FIG. 7, the tab switch 54-1 corresponding to the air conditioning system is labeled with characters "A/C" indicating an air conditioning system, and the tab switch 54-2 corresponding to the wipers is labeled with a symbol of a wiper. The tab switches 54 need not necessarily correspond to the equipment, and a plurality of equipment control buttons for controlling a single piece of equipment may be assigned to the plurality of tab switches 54.

The tab switches 54 are desirably displayed at an end of the screen of the touch panel 28. In the present embodiment, the tab switches 54 are displayed at the left end of the screen. However, the tab switches 54 may be displayed at the right end, the upper end, or the lower end of the screen of the touch panel 28. The plurality of tab switches 54 may be displayed at different ends of the screen from each other, such as the tab switch 54-1 being displayed at the left end and the tab switch 54-2 at the right end. The tab switches 54 may be displayed in the middle part of the screen instead of the ends of the screen.

The tab switches 54 are desirably displayed above the vehicle speed control button 50 or the notification buttons 52. As described above, the touch panel 28 stands upward from the upper surface of the armrest 26 on which the operator places his or her arm.

Accordingly, with the arm resting on the armrest 26, it is easier and quicker for the operator to operate the lower part of the touch panel 28 than the upper part of the touch panel 28. The vehicle speed control of the autonomous vehicle 10 and the notification to the outside of the vehicle are performed more frequently than at least the control of the equipment mounted on the autonomous vehicle 10, and often need to be performed more quickly than at least the control of the equipment mounted on the autonomous vehicle 10. Accordingly, by displaying the tab switches 54 above the vehicle speed control button 50 or the notification buttons 52, namely by displaying the vehicle speed control button 50 or the notification buttons 52 below the tab switches 54, the operator can more easily or more quickly operate the vehicle speed control button 50 or the notification buttons 52 than the tab switches 54.

How to operate the tab switches 54 and the details of the equipment operation buttons will be described later.

The touch panel 28 further displays drive mode change buttons 56, gear shift buttons 58, a P-brake button 60, and a state indicator 62.

The drive mode change buttons 56 are buttons for inputting a command to change the drive mode of the autonomous vehicle 10. In the present embodiment, the drive mode can be changed only while the autonomous vehicle 10 is stopped. Accordingly, while the autonomous vehicle 10 is stopped, an autonomous drive mode button for changing the drive mode to the autonomous drive mode, a semi-autonomous drive mode button for changing the drive mode to the semi-autonomous drive mode, and a manual drive mode button for changing the drive mode to the manual drive mode are displayed as the drive mode change buttons 56. While the autonomous vehicle 10 is traveling, only the button corresponding to the current drive mode (the autonomous drive mode button in the example of FIG. 6) is displayed as the drive mode change button 56. The drive mode change buttons 56 are desirably displayed in such a manner that the operator can see the current drive mode. In the example of FIG. 5, the current drive mode is the autonomous drive mode and therefore the autonomous drive mode button is displayed in a different manner (in a different color in the example of FIG. 5) from the semi-autonomous drive mode button and the manual drive mode button.

The gear shift buttons 58 are buttons for changing the gear (shift) of the autonomous vehicle 10. A plurality of buttons corresponding to parking (P), reverse (R), neutral (N), and drive (D) gears are displayed as the gear shift buttons 58. The gear shift buttons 58 are desirably displayed in such a manner that the operator can see the current gear.

In the example of FIG. 5, the current gear is D and therefore the button corresponding to the gear D is displayed in a different manner (in a different color in the example of FIG. 5) from the buttons corresponding to the other gears.

The P-brake button 60 is a button for inputting a command to engage and disengage an electric parking brake.

The state indicator 62 indicates the state of the autonomous vehicle 10. In the present embodiment, the state indicator 62 is a diagram showing the state of charge of the battery of the autonomous vehicle 10, the open or closed state of the door 18, the state of the ramp, and the detection states of the various sensors mounted on the autonomous vehicle 10. The state indicator 62 is not limited to the diagram but may be displayed in other forms. The state indicator 62 may indicate states other than the above states. Since the state indicator 62 is an indicator and is not a button, the state indicator 62 cannot be operated by the operator. As described above, the current drive mode can be shown by the drive mode change button 56, and the current gear can be shown by the gear shift button 58.

It can therefore be said that the drive mode change buttons 56 and the gear shift buttons 58 indicate the state of the autonomous vehicle 10.

The state indicator 62 is displayed on the side of the tab switches 54 that is closer to the middle of the screen. In the present embodiment, the tab switches 54 are displayed at the left end of the screen of the touch panel 28. The state indicator 62 is therefore displayed on the right side of the tab switch 54.

The drive mode change buttons 56, the gear shift buttons 58, and the P-brake button 60 are desirably displayed on the same screen as the vehicle speed control button 50, the notification buttons 52, and the tab switches 54. This allows the operator to easily switch operation between the vehicle speed control button 50, the notification buttons 52, and the tab switches 54 and the drive mode change buttons 56, the gear shift buttons 58, and the P-brake button 60.

The state indicator 62 is also desirably displayed on the same screen as the vehicle speed control button 50, the notification buttons 52, and the tab switches 54. The state of the autonomous vehicle 10 is thus displayed by the state indicator 62 or by the drive mode change buttons 56 and the gear shift buttons 58 on the same screen as the vehicle speed control button 50, the notification buttons 52, and the tab switches 54. This allows the operator to operate the vehicle speed control button 50, the notification buttons 52, or the tab switches 54 as soon as the operator checks the state of the autonomous vehicle 10.

How to operate the tab switch 54 and the manner in which the equipment control button group is displayed will be described.

In the present embodiment, the equipment control button group is displayed when the operator slides the tab switch 54. "Sliding" is an operation in which the operator touches the screen of the touch panel 28 with a finger or stylus (hereinafter simply referred to as "finger") and moves the finger while maintaining the contact between the finger and the screen. Especially in the present embodiment, the tab switches 54 are displayed at the end of the screen of the touch panel 28. Accordingly, when the operator slides the tab switch 54 toward the middle of the screen (to the right in the example of FIG. 7) as shown in FIG. 7, the equipment control buttons are displayed on the side of the tab switch 54 that is closer to the middle of the screen. The method for operating the tab switch 54 is not limited to sliding. The operator may tap the tab switch 54 (an operation of touching the tab switch 54 with a finger once) or double tap the tab switch 54 (an operation of touching the tab switch 54 with a finger twice within a short time).

Figure 8:
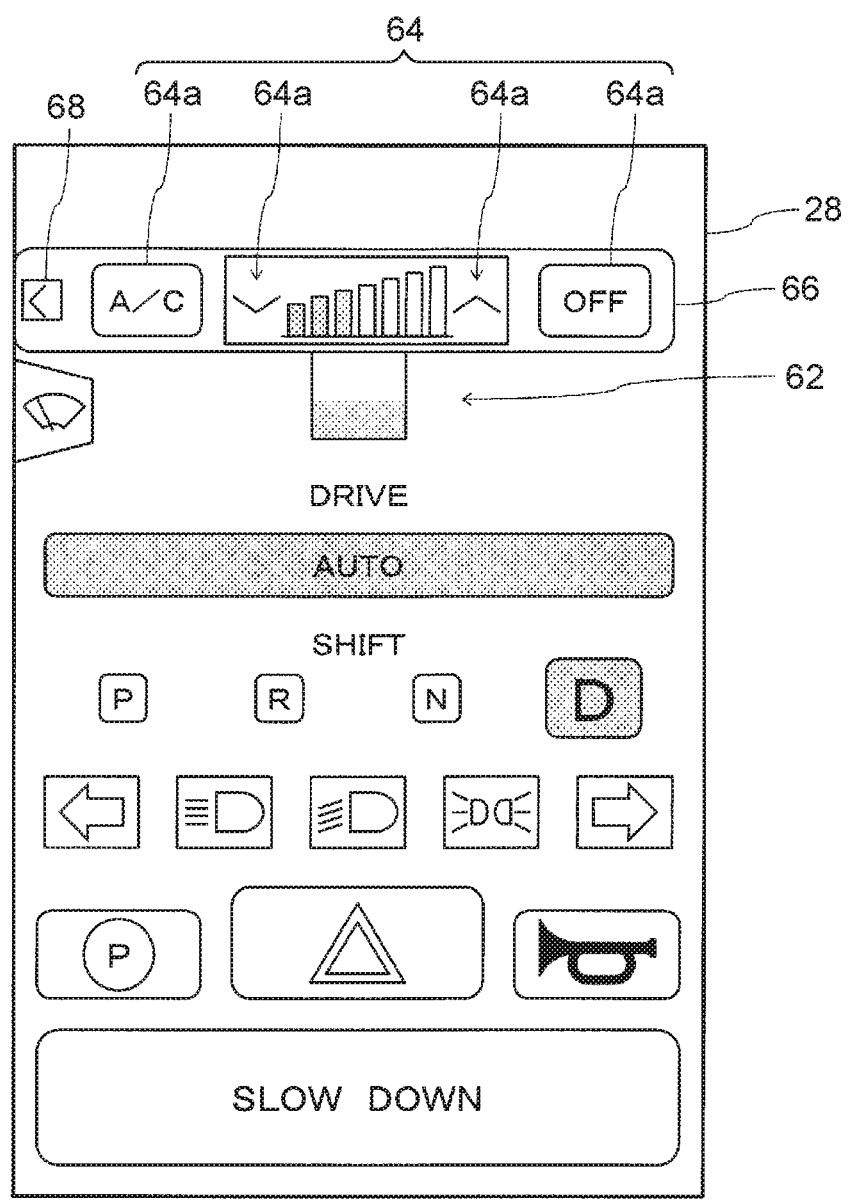
FIG. 8 illustrates a screen of the touch panel with an equipment control window displayed thereon.

FIG. 8 illustrates a screen of the touch panel 28 displaying an equipment control button group 64 (a plurality of equipment control buttons 64a). Since FIG. 8 is a screen that is displayed when the tab switch 54-1 (see FIG. 5) corresponding to the air conditioning system is operated, the equipment control button group 64 for controlling the air conditioning system is displayed on the screen. In the present embodiment, when the tab switch 54 is operated, an equipment control window 66 including the equipment control button group 64 is displayed. The equipment control window 66 further includes a window close button 68. When the window close button 68 is operated, the equipment control window 66 is closed, and the tab switch 54 is displayed again. The equipment control window 66 need not necessarily be displayed. When the tab switch 54 is operated, the equipment control button group 64 may be displayed on the screen without displaying the equipment control window 66.

As described above, in the present embodiment, the equipment control button group 64 is not displayed before the tab switch 54 is operated, and the equipment control button group 64 is displayed after the tab switch 54 is operated. This configuration reduces the number of equipment control buttons 64a that are displayed on the screen including the vehicle speed control button 50 and the notification buttons 52 before operation of the tab switch 54 and thus makes the screen simpler. This restrains reduction in operability of the screen including the vehicle speed control button 50 and the notification buttons 52 which is caused by making the equipment controllable using the touch panel 28.

Since the vehicle speed control button 50, the notification buttons 52, and the tab switches 54 are displayed on the same screen, the operator can easily switch operation between the vehicle speed control button 50 or the notification buttons 52 and the tab switches 54. That is, the operator operating the vehicle speed control button 50 or the notification button 52 can immediately operate the tab switch 54 to cause the equipment control button group 64 to be displayed on the screen. The operator operating the vehicle speed control button 50 or the notification button 52 can thus immediately control the equipment mounted on the autonomous vehicle 10.

In the present embodiment, the tab switches 54 correspond to the equipment mounted on the autonomous vehicle 10. Accordingly, by operating the tab switch 54, the operator can cause the entire equipment control button group 64 for controlling the equipment corresponding to the tab switch 54 to be displayed on the screen. This configuration improves operability of the touch panel 28 in the case of controlling the equipment.

It is desirable that at least a part of the equipment control button group 64 that is displayed by operating the tab switch 54 be displayed superimposed on a part of the state indicator 62. In the present embodiment, the state indicator 62 is displayed on the side of the tab switches 54 that is closer to the middle of the screen, namely on the right side of the tab switches 54. When the operator slides the tab switch 54 toward the middle of the screen, the equipment control button group 64 is displayed on the side of the tab switch 54 that is closer to the middle of the screen. A part of the equipment control button group 64, namely a part of the equipment control buttons 64a, is thus displayed superimposed on a part of the state indicator 62.

Since at least a part of the equipment control button group 64 is displayed superimposed on at least a part of the state indicator 62, it is less likely that the equipment control button group 64 is superimposed on the other buttons displayed on the touch panel 28. It is therefore less likely that the operator will not be able to operate the other buttons while the equipment control button group 64 is displayed. Especially, the equipment control button group 64 is desirably displayed so as not to be superimposed on the vehicle speed control button 50 and the notification buttons 52. This allows the operator to operate the vehicle speed control button 50 and the notification buttons 52 even while the equipment control button group 64 is displayed.

Figure 9:
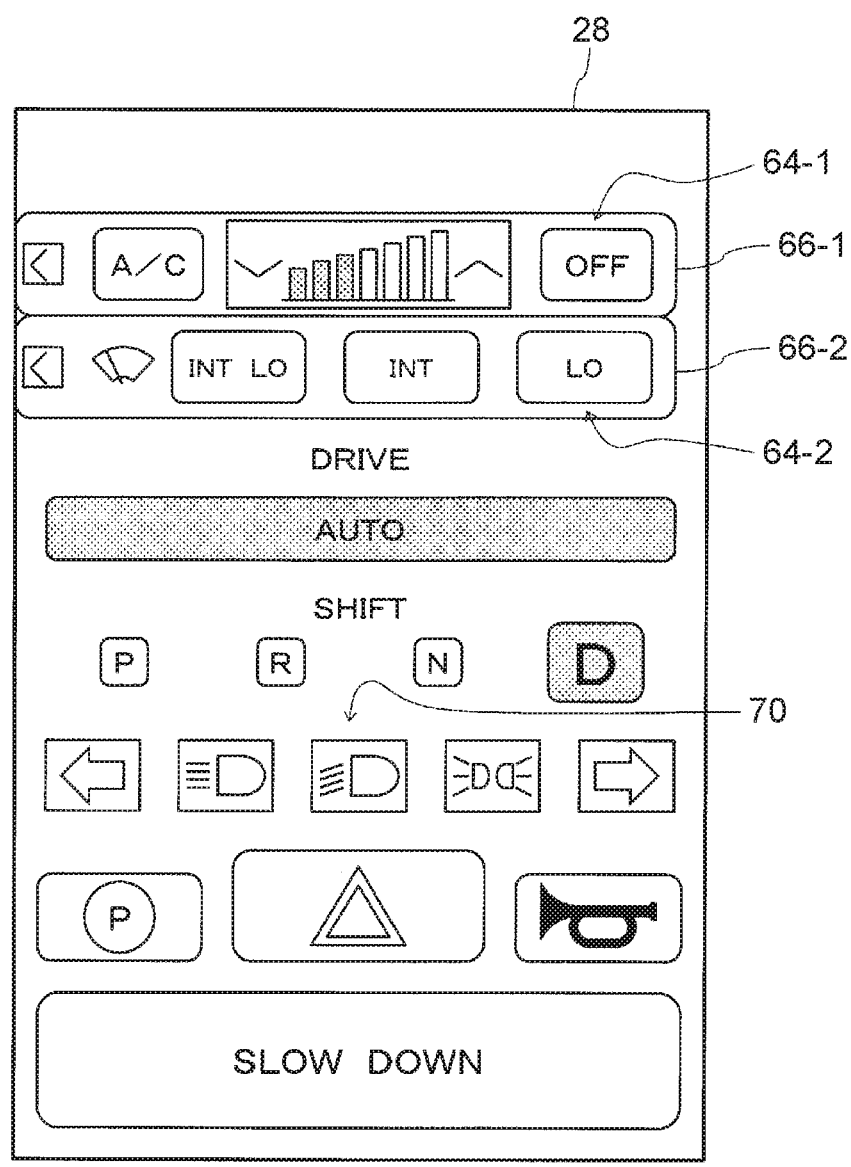
FIG. 9 illustrates a screen of the touch panel with a plurality of equipment control windows displayed thereon.

A plurality of equipment control button groups 64 corresponding to the plurality of tab switches 54 may be displayed simultaneously. FIG. 9 illustrates a screen on which an equipment control window 66-1 corresponding to the tab switch 54-1 (see FIG. 5) and an equipment control window 66-2 corresponding to the tab switch 54-2 (see FIG. 5) are displayed simultaneously. The equipment control window 66-1 includes an equipment control button group 64-1 for controlling the air conditioning system, and the equipment control window 66-2 includes an equipment control button group 64-2 for controlling the wipers. The plurality of equipment control button groups 64 corresponding to the plurality of tab switches 54 can thus be displayed simultaneously. This configuration improves operability of the touch panel 28 in the case of controlling a plurality of pieces of equipment.

In the above embodiment, the equipment control button group 64 that is not displayed on the touch panel 28 before operation of the tab switch 54 is newly displayed when the tab switch 54 is operated. However, the equipment control button groups 64 may be displayed in a reduced size before operation of the tab switch 54, and when the tab switch 54 is operated, the equipment control button group 64 corresponding to the operated tab switch 54 may be enlarged. The equipment control button groups 64 displayed in a reduced size before operation of the tab switch 54 may be of the type that does not accept input of an equipment control command even when the tab switch 54 is operated. That is, the equipment control button groups 64 may functionally be displayed as icons rather than as buttons.

Even in the case where the equipment control button group 64 is enlarged by operation of the tab switch 54, the equipment control button group 64 is displayed in a reduced size before operation of the tab switch 54. This configuration requires a smaller space on the touch panel 28 to display the equipment control button groups 64 and thus makes the display of the touch panel 28 simpler. This restrains reduction in operability of the screen including the vehicle speed control button 50 and the notification buttons 52 which is caused by making the equipment controllable using the touch panel 28.

In addition to the equipment control button groups 64 that are displayed by operation of the tab switches 54, permanent equipment control buttons 70 for controlling equipment mounted on the autonomous vehicle 10 may be displayed on the same screen as the vehicle speed control button 50 and the notification buttons 52 (and the tab switches 54).

The permanent equipment control buttons 70 are buttons for controlling the equipment different from the equipment controlled by the equipment control button groups 64. In the present embodiment, as shown in FIG. 9, light buttons for inputting a command to control headlamps and taillamps are displayed as the permanent equipment control buttons 70.

Since the permanent equipment control buttons 70 are displayed on the same screen as the vehicle speed control button 50 and the notification buttons 52, the operator can easily switch operation between the vehicle speed control button 50 or the notification buttons 52 and the permanent equipment control buttons 70. When none of the tab switches 54 is operated and no equipment control window 66 is displayed, the operator can operate the permanent equipment control buttons 70 more easily than the equipment control buttons 64a. Accordingly, it is desirable that, among the pieces of equipment mounted on the autonomous vehicle 10, those which are relatively frequently controlled, those which need to be controlled quickly, or those which require a small number of control buttons correspond to the permanent equipment control buttons 70, and the other pieces of equipment correspond to the equipment control button groups 64 that are displayed by operation of the tab switches 54. In the above embodiment, the light buttons are displayed as the permanent equipment control buttons 70. However, the permanent equipment control button 70 may be a wiper button for controlling the wipers.

Although the embodiment of the operation device for the autonomous vehicle according to the present disclosure is described above, the operation device for the autonomous vehicle according to the present disclosure is not limited to the above embodiment, and various modifications can be made without departing from the spirit and scope of the disclosure.

What is claimed is:

1. An operation device for an autonomous vehicle, comprising a touch panel configured to display at least one of a start button and a deceleration button, a notification button, and a tab switch on the same screen, the autonomous vehicle being autonomously drivable, the start button being a button for starting driving of the autonomous vehicle in an autonomous drive mode, the deceleration button being a button for decelerating the autonomous vehicle during the autonomous drive mode, the notification button being a button for performing notification to an outside of the autonomous vehicle, the notification button comprising blinker buttons a for inputting a command to turn on and off blinkers, a hazard button for inputting a command to turn on and off hazard lights, and a horn button for inputting a command to honk a horn, and the tab switch being a switch for displaying or enlarging an equipment control button group for controlling equipment mounted on the autonomous vehicle, the equipment comprising an air conditioning system, wipers, headlamps and taillamps, wherein:

when the autonomous vehicle is in a stopped state, the touch panel displays the start button for inputting a start command to the autonomous vehicle, and when the autonomous vehicle driving state, the touch panel displays the deceleration button for inputting a deceleration command to the autonomous vehicle; and a state indicator which indicates a state of the autonomous vehicle is further displayed on the same screen of the touch panel, and at least a part of the equipment control button group is displayed or enlarged so as to be superimposed on at least a part of the state indicator indicating the state of the autonomous vehicle.

2. The operation device for the autonomous vehicle according to claim 1, wherein:

the tab switch corresponds to the equipment mounted on the autonomous vehicle; and when the tab switch is operated, the equipment control button group for controlling the equipment corresponding to the tab switch is displayed or enlarged.

3. The operation device for the autonomous vehicle according to claim 2, wherein a plurality of tab switches including the tab switch are provided, and a plurality of equipment control button groups corresponding to the plurality of tab switches are displayable or enlargeable simultaneously.

4. The operation device for the autonomous vehicle according to claim 1, wherein the tab switch is displayed at any of upper, lower, right, and left ends of a screen, and the equipment control button group is displayed or enlarged when an operator slides the tab switch toward a middle of the screen.

5. The operation device for the autonomous vehicle according to claim 1, wherein at least one of the start button and the deceleration button or the notification button is operable with the equipment control button group being displayed or enlarged.

6. The operation device for the autonomous vehicle according to claim 1, wherein a permanent equipment control button for controlling permanent equipment mounted on the autonomous vehicle, the permanent equipment being different from the equipment corresponding to the tab switch, is further displayed on the same screen of the touch panel.

\* \* \* \* \*